United States Patent Office 2,838,580
Patented June 10, 1958

2,838,580

PROCESS FOR THE MANUFACTURE OF COMPOUNDS OF THE AZULENE SERIES

Leopold Ruzicka and Vladimir Prelog, Zurich, Switzerland, assignors to Ciba Pharmaceutical Products, Inc., Summit, N. J.

No Drawing. Application July 20, 1954
Serial No. 444,664

Claims priority, application Switzerland July 27, 1953

10 Claims. (Cl. 260—666)

This invention relates to an original process according to which compounds of the azulene series (bicyclo-[0:3:5]-decapentaene series) are obtained in a simple way and in good yield.

In general, the process comprises heating monocyclic ten-membered ring compounds of the alicyclic series having at most one double bond in the ring in the presence of catalysts to an elevated temperature bringing about transannular cyclization and dehydrogenation of the alicyclic ring system. Thus there may be heated to an elevated temperature monocyclic ten-membered ring compounds of the alicyclic series free from any oxygen groups and having at most one double bond in the ring in the presence of dehydrogenating catalysts, or appropriate compounds having oxygen groups in the presence of catalysts splitting off oxygen groups and dehydrogenating catalysts bringing about cyclization.

The oxygen groups in the mentioned starting materials are, for example, free or functionally converted hydroxyl or oxo groups. As examples of starting materials there are used advantageously cyclodecanone, cyclodecane, cyclodecene, cyclodecanol, cyclodecanol-(1)-one-(2), cyclodecanediol-(1,2) and cyclodecanedione-(1,2).

The reaction with the compounds having oxygen groups may be carried out in one or several steps. Thus it is possible to heat the aforesaid starting materials with a mixture of both catalysts, or to heat them first with the catalysts splitting off oxygen and then with the dehydrogenating catalyst. It is of advantage to carry out the first step at a higher temperature than the second. Catalysts splitting off oxygen groups are, for example, oxides, more especially aluminum oxide. For dehydrogenation there are used for example metal catalysts such as platinum, nickel, copper, but more especially palladium, or metalloids such as sulfur or selenium. A catalyst especially suitable for dehydrogenation is, for example, medium grained palladium carbon having a content of 10 percent of palladium.

The process is carried out at an elevated temperature preferably at a temperature of over 300° C. thus, for example, the splitting off of oxygen groups is carried out at about 425—450° C., the dehydrogenation at about 350° C. and the treatment with a mixture of both catalysts at about 375° C., those temperatures being avoided at which the azulenes formed are destroyed to any considerable extent. It is advantageous to pass the starting materials in the vapor phase over the catalysts and to keep the reaction time as short as possible.

The compounds obtained according to the process may be used in many ways, i. e. as medicaments with antiphlogistic action or as intermediate products in the dyestuff or pharmaceutical fields. They are also of further technical importance, for example azulene itself may be used as antiknock fuel for gasoline engines.

The following examples illustrate the invention.

*Example 1*

0.525 cc. of crude cyclodecane prepared according to the method of V. Prelog et al. (Helv. Chim. Acta 35, 1610, 1952) is pressed by means of a syringe impelled by a synchronomotor continuously through a steel capillary into the reaction tube containing the dehydrogenating catalyst (prepared according to Linstead et al., J. Chem. Soc. 1940, 1130) and transported by a current of pure nitrogen preheated to about 350° C. (4500 cc./min.) through the catalyst. The catalyst consists of medium grained palladium carbon (10 percent palladium), which is heated electrically to 339+1° C. and is packed in the reaction tube to form a mass about 3 cm. in diameter and about 7 cm. long. The dehydrogenation products are condensed in a water-cooled ball condenser and in a spiral condenser attached to it cooled to —80° C. The products are dissolved in pentane and the pentane solution diluted to 100 cc. In 1 cc. of this solution after diluting with toluene to 10 cc. the content of azulene is determined in the usual manner in a Beckman spectrophotometer. The value found corresponds to a yield of azulene of 19.6 percent. For the purpose of isolating the azulene the pentane solution is agitated with 50 cc. of a mixture of 200 grams of phosphoric acid of 84 percent strength and 60 grams of concentrated sulfuric acid. After washing it twice with pentane, the lower phase is poured onto ice, the separated azulene is again taken up in pentane, the solution is washed with sodium bicarbonate and water and dried. The product which remains behind after evaporating the solution is chromatographed over a 100 fold quantity of aluminum oxide (activity I—II) and finally sublimed twice. There is thus obtained azulene in blue-violet laminae melting at 98—99° C. It forms a 2,4,6-trinitro-benzolate which crystallizes in fine dark violet needles, and after being recrystallized twice from alcohol melts at 165–166° C.

In the same manner 1-methyl-cyclodecene is dehydrogenated to 4-methyl-azulene.

*Example 2*

0.525 cc. of a cyclodecene mixture prepared according to the method of V. Prelog et al. (Helv. Chimica Acta 35, 1613 (1952)) is dehydrogenated in a manner similar to that described in Example 1. The yield of azulene determined photospectrometrically amounts to 20.8 percent. The azulene is isolated according to the method described in Example 1. Pure cis-cyclodecene may be used instead of the cyclodecene mixture.

*Example 3*

8.1 grams of cyclodecanone are heated in a distilling flask under a pressure of 11 mm. of mercury to a temperature of 10° C. below its boiling point and washed with pure nitrogen through a tube 10 cm. long and 1.8 cm. wide, which is filled with finely grained aluminum oxide (commercial name "Alcoa," activated alumina, grade F-1, mesh 8-14) and heated to 425+5° C. The tube is connected over a descending ball condenser with an ice-cooled spiral condenser which is followed by a second condenser cooled to —50° C. The reaction is so adjusted that about 5 grams of the starting material passes through the catalyst per hour. The reaction product is taken up in pentane, the water is separated off in a separating funnel and the pentane solution is dried over sodium sulphate. The residue remaining behind after evaporation of the pentane solution is distilled under a pressure of 20 mm. of mercury and yields 4.1 grams of a mixture of hydrocarbon which passes over at 80–92° C. ($d_4^{20}=0.9117$). 2 grams of the starting material can be recovered. 0.525 cc. of the fraction of boiling point 20 mm./80–92° C. is dehydrogenated and worked up in the same manner as that described in Example 1. The yield of azulene amounts to 12.5 percent on dehydrogenation according to spectrophotometric measurement. The azulene is isolated according to the method described in Example 1.

*Example 4*

15.0 grams of cyclodecanol-(1)-one-(2) are subjected to splitting off of water at a temperature of 450+5° C. and a pressure of 11 mm. of mercury, according to the method described in Example 3. After working up with pentane in the aforementioned way the product is distilled under a pressure of 55 mm. of mercury. There are obtained 8.37 grams of a hydrocarbon mixture of boiling point 55 mm./85–118° C. $d_4^{20}$=0.9087. 0.525 cc. of this mixture is dehydrogenated and worked up in the same manner as that described in Example 1. The yield of azulene amounts to 9.2% on dehydrogenation according to spectro-photometric measurements. The azulene is isolated according to the method described in Example 1.

*Example 5*

2 grams of cyclodecanone are heated in a distilling flask of about 25 cc. capacity under a pressure of 30–50 mm. of mercury to a temperature about 10° C. below boiling point and washed with pure nitrogen through a tube 10 cm. long and 1.8 cm. in diameter, which is heated to 375+5° C. and filled with a mixture of 15 cc. of the medium grained palladium carbon (10 percent palladium) described in Example 1 and 8 cc. of the aluminum oxide described in Example 3. The tube is connected over a descending ball condenser with an ice-cooled spiral condenser which is followed by a second condenser cooled to −50° C. The bath temperature and the nitrogen current are chosen in such a way that the reaction lasts about 1–2 hours for the given quantity. The distillate is taken up in pentane, the pentane solution dried over sodium sulfate and the content of azulene is determined in the manner described in Example 1. The yield of azulene amounts to 7.1 percent. It is isolated according to the directions given in Example 1. In the same manner azulene may be obtained when cyclodecanol, cyclodecanol-(1)-one-(2), cyclodecanediol-(1,2) and cyclodecanedione-(1,2) are used as starting materials.

What is claimed is:

1. A process for the manufacture of compounds of the azulene series, which comprises heating at a temperature above 300° C. a monocyclic 10-membered ring hydrocarbon of the alicyclic series containing at least one member of the class consisting of hydroxyl and oxo groups and at most one double bond in the ring in the presence of an aluminum oxide catalyst and a metal dehydrogenating catalyst.

2. A process for the manufacture of compounds of the azulene series, which comprises heating at a temperature above 300° C. a monocyclic 10-membered ring hydrocarbon of the alicyclic series containing at least one member of the class consisting of hydroxyl and oxo groups and at most one double bond in the ring in the presence of a mixture of an aluminum oxide catalyst and a metal dehydrogenating catalyst.

3. A process for the manufacture of compounds of the azulene series which comprises heating at a temperature above 300° C. a monocyclic 10-membered ring hydrocarbon of the alicyclic series containing at least one member of the class consisting of hydroxyl and oxo groups and at most one double bond in the ring in the presence of an aluminum oxide catalyst and a palladium dehydrogenating catalyst.

4. A process for the manufacture of compounds of the azulene series which comprises heating at a temperature above 300° C. a monocyclic 10-membered ring hydrocarbon of the alicyclic series containing at least one member of the class consisting of hydroxyl and oxo groups and at most a double bond in the ring in the presence of an aluminum oxide catalyst and heating the resulting product with a metal dehydrogenating catalyst, the temperature used in the reaction with an aluminum oxide catalyst being higher than the temperature used in the reaction with a metal dehydrogenating catalyst.

5. A process in accordance with claim 1, wherein cyclodecanone is employed as the monocyclic 10-membered ring hydrocarbon of the alicyclic series.

6. A process in accordance with claim 1, wherein cyclodecanol-(1)-one-(2) is employed as the monocyclic 10-membered ring hydrocarbon of the alicyclic series.

7. In the process for the manufacture of compounds of the azulene series, the step which comprises heating at a temperature above 300° C. a monocyclic 10-membered ring hydrocarbon of the alicyclic series having at most one double bond in the ring with a metal dehydrogenating catalyst.

8. In the process for the manufacture of compounds of the azulene series, the step which comprises heating at a temperature above 300° C. a monocyclic 10-membered ring hydrocarbon of the alicyclic series having at most one double bond in the ring with a palladium dehydrogenating catalyst.

9. A process in accordance with claim 7, wherein cyclodecane is employed as the monocyclic 10-membered ring hydrocarbon of the alicyclic series.

10. A process in accordance with claim 7, wherein cyclodecene is employed as the monocyclic 10-membered ring hydrocarbon of the alicyclic series.

References Cited in the file of this patent

Helv. Chim. Acta., vol. 31, pages 1172–76 (1949).
Chemical Abstracts, vol. 34, page 7784[7] (1940).